Dec. 9, 1952 R. A. MEERS 2,621,253

ELECTRICAL WAVE TRANSMISSION SYSTEM

Filed May 20, 1947 2 SHEETS—SHEET 1

Inventor
Richard Adney Meers
By [signature]
Attorney

Dec. 9, 1952 R. A. MEERS 2,621,253

ELECTRICAL WAVE TRANSMISSION SYSTEM

Filed May 20, 1947 2 SHEETS—SHEET 2

Inventor
Richard Adney Meers
By E. D. Phinney
Attorney

Patented Dec. 9, 1952

2,621,253

UNITED STATES PATENT OFFICE 2,621,253

ELECTRICAL WAVE TRANSMISSION SYSTEM

Richard Adney Meers, London, England, assignor to International Standard Electric Corporation, New York, N. Y.

Application May 20, 1947, Serial No. 749,319
In Great Britain July 7, 1939

Section 1, Public Law 690, August 8, 1946
Patent expires July 7, 1959

7 Claims. (Cl. 178—44)

This invention relates to electric wave transmission systems and to electric wave transmission circuits subject to automatic gain control.

According to the invention, in an electric wave transmission circuit subject to automatic gain control dependent upon the level of the input signals, said automatic gain control is effected over a frequency dependent path.

Also according to the invention, in an electric wave transmission system including a volume range compression arrangement at the outgoing end of a transmission circuit and a volume range expansion arrangement at the incoming end of the transmission circuit, the volume range expansion arrangement is adapted to compensate for distortion introduced by the transmission circuit insofar as it affects the operation of said compression and expansion arrangements.

An embodiment of the invention will now be described, by way of example, reference being made to the accompanying drawings comprising Figs. 1 and 2.

Figure 1:
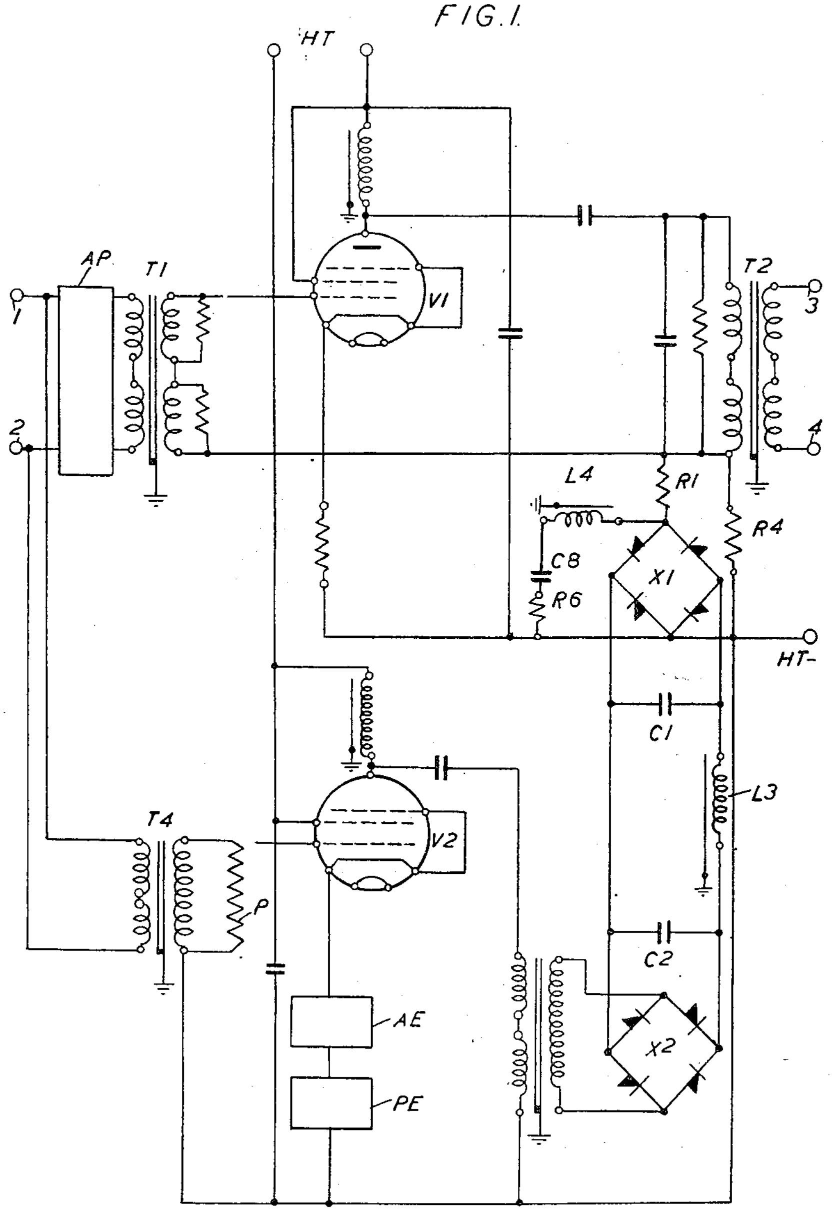
Figure 2:
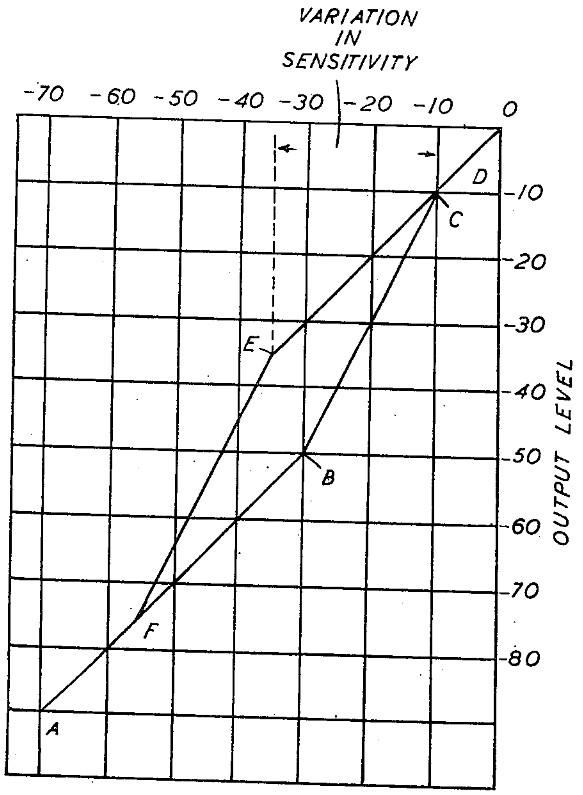

Fig. 1 is a circuit diagram of a volume range expansion arrangement (or expander) for use at the receiving end of a line circuit or radio circuit, and Fig. 2 is a curve illustrating the operation of the circuit of Fig. 1.

Referring to Fig. 1, the input terminals 1, 2 of the expander are connected to the output terminals 3, 4 via an attenuator pad AP, input transformer $T_1$, valve $V_1$, and output transformer $T_2$. The expander is inserted in the transmission path at any suitable point (it should not be inserted at a point where the speech is inverted or scrambled). Across the input terminals 1, 2 is bridged a high impedance transformer $T_4$ which takes a certain portion of the compressed input received at terminals 1, 2 and applies it to a control valve $V_2$ where it is amplified, the amplified output being rectified by the bridge rectifier $X_2$. The direct current output from the rectifier $X_2$ is applied to a bridge rectifier $X_1$ which is in a negative feedback path of the valve $V_1$ in the transmission path. With a very low level of input to the expander, the output from the rectifier $X_2$ is so low that the voltage applied to the rectifier $X_1$ is substantially zero with the result that the impedance of rectifier $X_1$ is unchanged and the gain of valve $V_1$ is unaffected. After a certain input, however, the output from $X_2$ causes a positive voltage to be applied in the forward direction of the rectifier elements of $X_1$, said voltage being of sufficient value to cause the impedance of $X_1$ to fall and thus to reduce the negative feedback and to increase the gain of valve $V_1$. This continues over a certain predetermined range of input level after which the gain of valve $V_1$ is again reduced.

In Fig. 2 the curve ABCD shows the relationship between the input and output levels of the expander of Fig. 1 obtained by this control of negative feedback, the desired expansion effect being obtained over the range BC.

Resistances $R_4$ and $R_1$, respectively, in shunt to, and in series with, the rectifier bridge $X_1$ cause the limiting action at the two ends.

The choke $L_3$ and condensers $C_1$ and $C_2$ serve the dual purpose (a) of reducing the amount of harmonics passed from the rectifier $X_2$ to the rectifier $X_1$, and (b) of enabling a desired operate and hangover time to be obtained. A suitable operative time is 25 milliseconds in the case under consideration, and the hangover time is similar. The use of the choke $L_3$ instead of a resistance also allows the biassing voltage applied to the rectifier $X_1$ to be fairly high as the D. C. resistance of $L_3$ may be quite low.

In order to control the points between which expansion occurs, a potentiometer P is shunted across the secondary winding of transformer $T_4$ so as to vary the amounts of current passed to the control stage. New expansion curves such as AFED can thus be obtained. It will be seen that the range and ratio of expansion remains constant although the upper and lower levels between which expansion occurs are altered.

If an expander is connected to the incoming end of a line having a flat attenuation/frequency characteristic and having no phase distortion, and if a corresponding compressor is connected to the outgoing end of the line, then the overall transmission will be completely distortionless. In practice it is often not convenient to connect the compressor and expander at such points in the circuit that these conditions are fulfilled.

When the circuit between a compressor and an an expander causes amplitude distortion or phase distortion, the compandor (i. e. compressor plus expander) may or may not produce distortion, when using known circuits, depending on the shape of the speech envelope. By arranging the circuit of the expander according to Fig. 1 it is possible, however, to ensure that no overall distortion will occur, due to the operation of the compandor, irrespective of whether the connecting line introduces amplitude distortion or phase distortion (provided that the individual compressor and expander circuits do not introduce distortion).

In Fig. 1, the control valve $V_2$ is provided with a negative feedback circuit which includes an attenuation equaliser AE and a phase equaliser PE. The equalisers AE and PE are conveniently connected in the cathode lead of the valve $V_2$, which then forms a frequency dependent negative feedback circuit. The equalisers AE and PE are designed to have attenuation/frequency and phase shift/frequency characteristics which are complementary to those of the line connecting the compressor and the expander. In these circumstances the introduction of the compandor will add no additional distortion to the line although the attenuation and phase shift equalisers AE and PE will not affect the "static" characteristic of the line, i. e. if the line requires attenuation and/or phase shift equalisation when compandors are not fitted, such correction will still be necessary when compandors are fitted and should be equipped after connecting the expander at the receiving terminal.

A series circuit comprising an inductance $L_4$, a condenser $C_8$ and a resistance $R_6$ is shunted across the bridge $X_1$ so as to maintain the same overall gain/frequency characteristic of the compandor irrespective of variations of level. At high levels, the gain/frequency characteristics of the compressor and expander are complementary so that (with the above proviso) the overall circuit is distortionless. At low levels, however, the grain/frequency characteristics of the compressor and expander would diverge in the absence of the circuit $L_4$, $C_8$, $R_6$. The equalising circuit $L_4$, $C_8$, $R_6$ has accordingly been connected in the A. C. portion of the control path of the expander to counteract the lack of linearity in the gain/frequency characteristic of the compressor.

What is claimed is:

1. An electrical wave transmission system, comprising a transmission medium having an outgoing and incoming end, a volume range compression arrangement connected to said transmission medium at the outgoing end thereof, a volume range expansion arrangement connected to said transmission medium at the incoming end thereof, said volume range expansion arrangement including a control electron discharge device and an attenuation equalizer network connected to said control electron discharge device having an attenuation-frequency characteristic complementary to that of said transmission medium and operative in response to incoming signals to automatically compensate for distortion introduced by the transmission circuit insofar as it affects the operation of said compression and expansion arrangements.

2. The electrical wave transmission system as set forth in claim 1, wherein said volume range expansion arrangement further includes a phase equalizer network connected to said control electron discharge device having a phase-shift frequency characteristic complementary to that of said transmission medium.

3. A wave transmission system comprising a transmitting medium, a receiver coupled to said transmitting medium, said receiver having a signal amplifier therein, control means connected to said transmitting medium operative to develop a control voltage varying in accordance with signals incoming to said receiver, circuit means connected to said signal amplifier and said last named means being operative to vary the gain of said signal amplifier in response to said control voltage, said control means including an electron discharge device, a phase and attenuation equalizing network connected to said electron discharge device and means including said equalizing networks operatively connected to said signal amplifier for automatically compensating against additional distortion caused by frequency attenuation and phase shift distortion in said transmitting medium.

4. The wave transmission system as set forth in claim 3, and further comprising means operative to apply an adjustable fraction of an input signal voltage to said control means.

5. The wave transmission system as set forth in claim 3 and further comprising a rectifier arrangement connected to the output of said electron discharge device in said control means, said circuit means being operative to apply the unidirectional voltage from said rectifier to said signal amplifier.

6. The wave transmission system as set forth in claim 5 wherein said circuit means includes a dry contact rectifier network and the unidirectional voltage from said first named rectifier is employed to control the resistance of said dry contact rectifier network.

7. The wave transmission system as set forth in claim 6, and further comprising a frequency responsive circuit connected across said dry contact rectifier network.

RICHARD ADNEY MEERS.

REFERENCES CITED

The following references are of record in the file of this patent:

UNITED STATES PATENTS

| Number | Name | Date |
|---|---|---|
| 2,087,316 | Doba | July 20, 1937 |
| 2,096,027 | Bode | Oct. 19, 1937 |
| 2,193,966 | Jones | Mar. 19, 1940 |
| 2,246,058 | Monk | June 17, 1941 |